3,780,156
PROCESS FOR MAKING FILLED METHYL METHACRYLATE ARTICLES

Donald D. Cameron, Wilmington, Del., assignor to E. I. du Pont de Nemours and Company, Wilmington, Del.
No Drawing. Filed Apr. 3, 1972, Ser. No. 240,823
Int. Cl. B29c 3/00; C08f 45/10
U.S. Cl. 264—300   14 Claims

ABSTRACT OF THE DISCLOSURE

Disclosed herein is a process for making a highly filled polymethyl methacrylate article containing 50 to 80 percent by weight of particulate hydrate of alumina and 4 to 20 percent by weight of glass filaments.

BACKGROUND OF THE INVENTION

Field of the invention.—This invention relates to a process for making highly filled plastic articles. More specifically, it relates to a process for making highly filled articles of methyl methacrylate containing a large proportion of a hydrated alumina, preferably aluminum trihydrate, and a minor proportion of glass filaments. Such compositions are weather resistant, flame resistant and tough. As such they are useful as roofing tiles, panels, sheet products and trim parts of the building industry.

Discussion of the prior art.—Filled plastic and various methods for their manufacture constitute a well-developed art. Specifically, articles of manufacture comprising polymeric methyl methacrylate and an inert filler selected from a group of materials including alumina are disclosed in U.S. Pat. Re. 27,093. The use of aluminum trihydrate as a filler in polyesters to impart flame resistance is disclosed in an article by Connolly and Thornton in Modern Plastics 43, 154 (1965), and the specific use of aluminum trihydrate in methyl methacrylate articles is disclosed in copending U.S. application Ser. No. 3,524 for The Use of Hydrated Alumina in a Polymethyl Methacrylate Article, filed by R. B. Duggins on Jan. 16, 1970, now abandoned. Finally the use of fiberglass as a filler in plastic systems to impart impact strength is well known, and the combined use of alumina trihydrate and fiberglass in plastic systems is disclosed in the Connolly and Thornton article discussed above.

In general, however, the use of glass filaments and aluminum trihydrate fillers in plastic systems are at odds with one another. The filler is used to impart flame resistance, and it is necessary to use large amounts of it (typically 50 to 60% by weight) to achieve a flame resistance rating that meets modern building code requirements, i.e., Class B or preferably Class A ratings. The fiberglass is used to impart impact strength, and again it is necessary to use large amounts of it (typically 30 to 50% by weight) to impart the toughness necessary to be useful in those same markets. In view of the need for sufficient plastic material to bind the structure together into a homogeneous mass (typically 20–40% by weight), it is difficult to find a combination of these ingredients which will produce a plastic article with both high impact strength and high flame resistance.

It has been found and is disclosed in copending application Ser. No. 240,650, filed Apr. 3, 1972, that as little as about 4% by weight of glass filaments can be used to produce an article with an impact strength suitable for use in the building industry. The use of such a small amount of fiberglass permits the use of larger amounts of hydrated alumina filler with a consequent increase in the flame resistance of the article. It has also been found that the addition of a small amount of fiberglass, i.e., up to about 20% by weight, rather than reduce the flame resistance or have no effect upon it, actually improves the flame resistance of the structure.

The higher the filler level of aluminum trihydrate, the higher the flame resistance, and the higher the filler level of glass filaments, the higher the impact strength. At such high filler levels, however, the viscosity of the mixture is increased to the point where it becomes difficult to work with. Furthermore, the higher viscosity of the mixture will adversely effect the physical properties of the finished product, particularly when the product is a thin structure, i.e., one having a thickness below half an inch. The problem is caused by incomplete wetting of the filler by the resin. To overcome this problem, some means is needed to reduce the viscosity to a level where substantially complete wetting of the filler material can be achieved when only about 20 to about 35% resin is used.

SUMMARY OF THE INVENTION

Highly filled methacrylate articles can be produced by a process comprising: forming a polymerizable mixture comprising (a) about 50 to about 80% by weight of a hydrate of alumina in particulate form;

(b) about 4 to about 20%, preferably 4 to 14%, by weight of glass filaments having a length of about 0.1 to about 3.0 inches;

(c) about 20 to about 35% by weight of a polymerizable constituent, the major portion of which is a polymerizable methyl methacrylate constituent;

(d) a small amount of an initiator system for the polymerizable constituent; and (e) up to about 2.0%, preferably about 0.2%, by weight of an acid or acid derivative viscosity modifier; introducing the mixture onto a casting surface; and curing the mixture.

In the preferred embodiments, the filaments are disposed in the mixture in discrete bundles which are aligned parallel to the surface of the structure, the filaments have a length which is at least as long as the thickness of the structure, and the hydrate of alumina is aluminum trihydrate. As far as the acid modifier is concerned, any moderate length aliphatic monoacid having 6–20 carbon atoms or monoesters of the diacids in which the acid precursor has 4 to 20 carbon atoms will produce some viscosity reduction. The preferred materials are "Zelec"[1] UN lubricant, Zelec® (NE or NK) antistatic agents (all of which are fatty alcohol phosphate compositions which are mono and dialkyl esters of ortho phosphoric acid), octanoic acid, hexanoic acid, decanoic acid, monochloroacetic acid, dichloroacetic acid, trichloroacetic acid, stearic acid, and monoesters of dicarboxylic acids such as monomethyl adipate, monomethyl ester of maleic acid, monomethyl maleate, monoethyl fumarate, monomethyl glutarate, and monomethyl succanate and the hemiperester, t-butyl peroxymaleic acid.

DISCUSSION OF THE PREFERRED EMBODIMENT

Methyl methacrylate is mixed with filler and fiberglass and polymerized to form a useful article. Each ingredient provides desirable properties.

Weather resistance and a bonding matrix are provided by the poly(methyl methacrylate) resin.

Fire resistance is provided by keeping the resin content low and the filler content high. The filler contains a high concentration of water of hydration which is given off at high temperatures, thereby providing fire resistance by cooling the article and excluding oxygen. The filler is a hydrated alumina, preferably aluminum trihydrate, which is present in concentrations of about 50 to about 80%

---
[1] Registered trademark of E. I. du Pont de Nemours & Co.

by weight of the article, preferably 60 to 70% by weight. The filler is in particulate form with a suitably small particle size. Aluminum trihydrate is sold by designation related to particle size, but the particles within a particular grade or designation have a distribution of sizes. The sizes of the particles used as fillers will effect the ability of the resin to wet the particles, and the viscosity of the mixture. The viscosity of the mixture will then effect the distribution of the glass filaments within the mixture and the ease with which the mixture is cast or extruded. For these reasons, the particles used should preferably have a diameter ranging from about 0.1 to about 70.0 microns. Examples of aluminum trihydrate grades (listed in order of decreasing size) with particles which fall substantially within this range are those sold under the designation C–33, C–30BF, and Hydral® 710 by the Alcoa Co. Unless some other means is used to control the viscosity of the mixture, it is desirable to use a mixture of such fillers. An example of such a mixture, chosen to provide a distribution of particle sizes suitable to maintain the viscosity of the mixture in a range which will keep the fiberglass from separating during the process, is a mixture containing 75–90% C–30BF and 10–25% of Hydral® 710, both based on the total weight of the filler. Optionally, if some other means, discussed in Example 4 below, is used to thicken the resin, intermediate sized particles (C–30BF) may be used as the only filler.

In addition to the fire resistance provided by the low resin content and the hydrated filler content, the use of glass filaments unexpectedly provides an increase in fire resistance. Fiberglass is inert. Its presence in the article would not be expected to contribute to flame resistance by any mechanism other than by the fact that it replaces some of the resin which fuels the fire. The use of a small amount of fiberglass, between 4 and 20% by weight, in an article containing a hydrated filler, however, has a synergistic effect on flame resistance as measured by those tests which simulate actual conditions on a burning roof.

Toughness or impact strength is provided by the glass filaments. While it is generally known that fiberglass provided in large quantities, will improve the toughness of plastic articles, such quantities of fiberglass would decrease the amount of hydrated filler that could be used in such a structure. An article with sufficient impact strength for use in the building industry can be produced using about 4 to about 20%, preferably 4 to 14%, by weight of the fiberglass. If the fiberglass is in the form of discrete bundles, generally aligned parallel to a plane tangent to the surface of the article, then the structure will have an impact strength considerably higher than a comparable structure with the fiberglass dispersed uniformly throughout the composition. The desired level of impact strength can be achieved using about 4 to about 14% by weight of fiberglass. The glass filaments should have a length of about 0.1 to about 3.0 inch. Below about 0.1 inch the impact strength of the article drops below that of commercial substitutes, such as slate, and above 1.0, they produce a mixture that is difficult to work with, especially when the structure is formed by casting a mixture containing the glass filaments. If, however, the glass filaments are disposed on or between layers of the cast material, using a bulk molding process, then filaments having a length of up to about 3.0 inches can be used. It is desirable for the glass fibers used to have a high bulk density, and also that the fiber bundles have a binder which has a low solubility in methyl methacrylate monomer. Satisfactory grades are Johns-Manville CS–308A and R–308J. To maximize the reinforcement provided by the filaments they should preferably have a length which is at least as long as the thickness of the article. Alternatively, the fibers can be present in the structure in woven or nonwoven materials of filament or staple fiber.

The polymer constituent of the present invention can be any methyl methacrylate polymer such as methyl methacrylate homopolymers and copolymers of methyl methacrylate with alpha-ethylenically unsaturated compounds (e.g., vinyl acetate, styrene, alkyl acrylates, acrylonitrile, alkyl methacrylates, multifunctional acrylic monomers, such as alkylene dimethacrylate and alkylene diacrylates, etc.). Therefore, the polymerizable constituent can be methyl methacrylate alone or mixed with other $\alpha,\beta$-ethylenically unsaturated compounds are preformed polymer. In the preferred process, however, the polymerizable composition is formed from a sirup containing about 10 to about 45% by weight of methyl methacrylate polymer (preferably having an inherent viscosity of 0.25–1.0) dissolved in monomeric methyl methacrylate. The sirup can also include up to 20% by weight, preferably only a few percent, of ethylene dimethacrylate, as does the sirup described in U.S. Pat. 3,380,980.

The polymer in monomer sirup may be prepared by any of the methods described in British Pat. No. 870,191 or U.S. Pat. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mol percent of a chain transfer agent such as the alkyl mercaptans and the mercaptans described in U.S. Pat. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate.

For the purpose of the present invention, the preferred sirup contains 10–45% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), p. 128. As mentioned previously, the polymer may also be a copolymer involving a major portion of the methyl methacrylate monomer with such monomers as vinyl acetate, styrene, methyl acrylate, ethyl acrylate, butyl acrylate, cyclohexyl acrylate, ethyl methacrylate, butyl methacrylate, cyclohexyl methacrylate, etc.

The polymerizable composition may also contain a cross-linking agent added to the sirup in an amount up to 20%, preferably 0.5 to 2.0%, by weight upon completion of quenching. Any suitable poly-unsaturated, cross-linking agent may be used, e.g., ethylene glycol dimethacrylate, propylene glycol dimethacrylate, polyethylene glycol dimethacrylate, divinyl benzene, triallyl cyanurate, and diallyl phthalate. If desired, a portion, i.e., up to about 2% of the cross-linking agent may be added to the preferred sirup composition prior to quenching.

Polymerization of the mixture can be accomplished by using any suitable initiator system such as from about 0.1 to about 2.0%, preferably about 0.6% of a conventional free radical initiator, preferably the initiator is a peroxy compound or an azo compound. Lauroyl peroxide, t-butyl peroxypivalate and t-butyl peroxymaleic acid are examples of such initiators.

The mixture can be cast or extruded onto a casting surface which can be adapted to allow the mixture to cure autogenically or can be part of a compression mold so that the mixture can be subjected to a pressure of about 15 to about 1500 p.s.i. and a temperature of about 30° C. to about 130° C. for a time sufficient to cure the mixture.

The fibers are added to the mixture in discrete bundles. While not essential, it is preferred that they be added to the mixture last so that the extensive mixing used to disperse the other ingredients throughout the mixture will not break the fibers or disturb the bundles. The bundles are added to the mixture last and stirred lightly by hand so that they are not broken. During the molding process they assume an orientation parallel to the plane of the article.

If the mixture is molded, the use of up to 5.0%, preferably about 0.1%, of a mold release agent such as zinc stearate or Zelec® UN lubricant is helpful.

The viscosity of the polymerizable mixture will affect the final product and the process for its manufacture. If the viscosity is too low, for example, the polymerization rate is decreased and also the glass filaments have a tendency to settle into one region of the mixture. If the viscosity is too high the mixture is difficult to stir and it is difficult to achieve high filler loading. Control of the viscosity is one of the reasons why in the preferred embodiment, the diameter of the filler is in the range of 0.1 to 70.0 microns. Even in this range, some other means to decrease the viscosity is desirable. In particular the viscosity of the mixture can be decreased by adding to the mixture up to 2.0%, preferably 0.2%, of any moderate length aliphatic mono or diacid having 1 to 20 carbon atoms as a viscosity modifier. The preferred materials are Zelec® UN lubricant, Zelec® (NE or NK) antistatic agents (all of which are fatty alcohol phosphate compositions), octanoic acid, stearic acid, and hemiperesters of dicarboxylic acids such as t-butyl peroxymaleic acid. When Zelec® UN lubricant is used, it functions as both a viscosity modifier and a mold release. When t-butyl peroxymaleic acid is used, it functions as both a viscosity modifier and a polymerization initiator.

The important improvements obtained by the present invention will be more clearly understood by referring to the examples which follow. These examples, which illustrate specific embodiments of the present invention, should not be construed to limit the invention in any way.

EXAMPLE 1

A sirup of about 23% by weight of methyl methacrylate homopolymer dissolved in methyl methacrylate monomer is prepared by partial polymerization in situ and about 1.25% ethylene dimethacrylate is added to the mixture. This composition has received the designation of Lucite® Acrylic Sirup LE 1003. To 300 parts of this sirup are added 1.8 parts of lauroyl peroxide initiator (LA) and 2.0 parts of Zelec® UN lubricant. Then 490 parts of Alcoa grade C-30BF aluminum trihydrate and 150 parts of Alcoa grade Hydral® 710 aluminum trihydrate are combined in a high speed blender with 0.5 part of TiO₂ white pigment and 0.3 part of carbon black. This filler-pigment mixture is then combined with the sirup mixture. Finally 60 parts of Johns-Manville grade CS-308A fiberglass (bundles) having a nominal length of ½" is added to the combined mixture and is stirred into the mixture by hand using a spatula.

The blend is then compression molded into sheets ⅛" x 15" x 15", using a press temperature of 105° C. and a pressure of 178 p.s.i. A cure occurred in 10 minutes, and as can be seen from Table I, the impact strength of unnotched specimens of the above composition, when measured according to the ASTM D-256 (modified-flatwise) test and the falling ball impact test, compares favorably with the impact strength of an unfilled acrylic sold under the trade name "Evr-Kleer" and with Buckingham-Virginia slate.

TABLE I

| Material | Charpy, ft.-lbs./in.² | Falling ball height (in.) |
|---|---|---|
| Example 1 | 8.9 | 35 |
| "Evr-Kleer" | 6.6 | 28 |
| Slate | 0.7 | 12 |

EXAMPLES 2-3

In a process similar to that set forth in Example 1, the following ingredients are mixed.

TABLE II

| | Example 2 | Control A | Example 3 | Control B |
|---|---|---|---|---|
| LE 1003 | 29.2 | 29.2 | 29.2 | 29.2 |
| C-30BF | 47 | 47 | 42 | 42 |
| Hydral® 710 | 17 | 17 | 13 | 13 |
| LA | 0.6 | 0.6 | 0.6 | 0.6 |
| Zelec® UN | 0.2 | 0.2 | 0.2 | 0.2 |
| CaCO₃ | 0 | 6 | 0 | 15 |
| CS-308A (⅛") | 6 | 0 | 15 | 0 |

Each mixture was cast into matched metal molds and cured at a temperature of 108° C. and 1000 p.s.i. to form sheets having a thickness of ⅛". The Radiant Panel Flame Spread Index (ASTM designation E-162-67) and the oxygen index values (ASTM designation D-2863) were measured on these samples and the results are shown in Table III.

TABLE III

| Structure | Percent Polymer | Al₂O₃·3H₂O | CaCO₃ | Glass | Flame spread index | Oxygen index (percent) |
|---|---|---|---|---|---|---|
| Example 2 | 30 | 64 | 0 | 6 | 7 | 62 |
| Control A | 30 | 64 | 6 | 0 | 44 | 50 |
| Example 3 | 30 | 55 | 0 | 15 | 5 | 59 |
| Control B | 30 | 55 | 15 | 0 | 76 | 42 |

EXAMPLE 4

To 90.0 parts of the sirup of Example 1, 0.14 part of t-butyl peroxymaleic acid and 0.40 part of lauroyl peroxide are added. During the first minute of mechanical mixing, 0.224 part of octanoic acid is added and during the next five minutes of mixing 192 parts of C-30BF aluminum trihydrate and 0.04 part of water are added. After six minutes the mechanical mixing is stopped and 18 parts of Johns-Manville grade CS-308A fiberglass having a nominal length of ½" are added and hand mixed into the above mixture.

The mixture was poured into a metal mold, allowed to sit from two to five minutes during which time the viscosity increased, due to polymerization, to the point where the mixture flows as a homogeneous mixture. The mixture is then compressed for ten minutes under a pressure of 125 p.s.i. and a press temperature of 100° C. The mold was cooled and the filled article ⅛" x 14.5" x 14.5" in size removed.

A roof made from these samples laid as shingles on a ½" plywood base with a single layer of 30 lb. Phillip Casey fiber-rock roofing felt underlay achieves a Class A flame spread rating, a Class A burning brand rating, and a Class B intermittent flame rating when subjected to the roofing fire tests described in Underwriters' Laboratory pamphlet "UL-790."

EXAMPLES 5-9

To 300 gms. of the sirup of Example 1, 700 gms. of C-33 aluminum trihydrate is added and mixed in a Jiffy mixer. To this mixture is added 0.3% by weight of the viscosity modifiers listed in Table IV. The viscosity of these mixtures are measured with a Brookfield viscosimeter and compared to that of Control C.

TABLE IV

| Structure | Viscosity modifier | Viscosity (poise) |
|---|---|---|
| Control C | None | 75 |
| Example 5 | Hexanoic acid | 39 |
| Example 6 | Octanoic acid | 39 |
| Example 7 | Decanoic acid | 42 |
| Example 8 | t-Butyl peroxymaleic acid | 59 |
| Example 9 | Dichloroacetic acid | 58 |

As can be seen from Table IV, the viscosity of the mixture was substantially reduced by use of the acids, particularly by the use of octanoic and hexanoic acid.

EXAMPLE 10

To 90.0 gms. of the sirup of Example 1 are added 0.54 gm. of lauroyl peroxide, 192 gms. of C–30BF aluminum trihydrate. This mixture was stirred in a Jiffy mixer and 18.0 gms. of CS–308A, ½" fiberglass was stirred in with a wood tongue depressor. Without octanoic acid, a great deal of force was required to mix in the glass fibers with consequent harm to the integrity of the fibers. An identical batch was then made except that 8 drops (0.22 gm.) of octanoic acid was included before the C–30BF was added. It was noticeably easier to stir in the fiberglass than in the control above.

What is claimed is:

1. In a process for preparing an article of manufacture, comprising the steps of:
   (1) forming a polymerizable mixture containing
      (a) about 50 to about 80% by weight of a hydrate of alumina in particulate form;
      (b) about 4 to about 20% by weight of glass filaments having a length of about 0.1 to about 3.0 inch;
      (c) about 20 to about 40% by weight of a polymerizable constituent, the major portion of which is a polymerizable methyl methacrylate constituent; and
      (d) a small amount of an initiator system for said polymerizable constituent;
   (2) introducing said mixture onto a casting surface; and
   (3) curing said mixture;
the improvement comprising decreasing the viscosity of said polymerizable mixture by adding to said mixture up to about 2% by weight of a viscosity modifier selected from the group consisting of aliphatic monoacids having 1 to 20 carbon atoms or monoesters of diacids in which the acid precursor has 4–20 carbon atoms or mono and dialkyl esters of ortho phosphoric acid.

2. The process of claim 1 wherein said glass filaments have a length of about 0.1 to about 1.0 inch.

3. The process of claim 2 wherein said glass filaments are disposed within said mixture in discrete bundles generally aligned in a direction parallel to the surface of said casting surface.

4. The process of claim 3 wherein said hydrate of alumina is aluminum trihydrate.

5. The process of claim 4 wherein said viscosity modifier is selected from the group consisting of hexanoic acid, octanoic acid, decanoic acid, stearic acid, monochloroacetic acid, dichloroacetic acid, and trichloroacetic acid.

6. The process of claim 4 wherein said polymerizable mixture further comprises about 0.5 to about 20% by weight, preferably about 0.5 to about 2.0% by weight, of a cross-linking agent for said polymerizable constituent.

7. The process of claim 4 wherein said initiator system is a thermally activated initiator selected from the group cosisting of peroxy polymerization initiator compounds and azo polymerization initiator compounds.

8. The process of claim 4 wherein said initiator system comprises t-butyl peroxymaleic acid, ethylene glycol dimercaptoacetate, calcium hydroxide and water.

9. The process of claim 4 wherein said casting surface is part of a compression mold and the step of curing said mixture comprises subjecting said mixture to a pressure of about 15 to about 1500 p.s.i. at a temperature of about 80 to about 130° C. for a time sufficient to cure said mixture.

10. The process of claim 4 wherein said mixture comprises 4 to 14% by weight of glass filaments.

11. The process of claim 3 wherein said hydrate of alumina is aluminum trihydrate having a particle size distribution such that substantially all of said particles have a diameter of about 0.1 to about 70.0 microns.

12. The process of claim 3 wherein said initiator system comprises a free radical initiator selected from the group comprising lauroyl peroxide, t-butyl peroxypivalate or t-butyl peroxymaleic acid.

13. The process of claim 3 wherein said polymeric constituent is a polymerizable sirup of methyl methacrylate containing 10–45% by weight of methyl methacrylate polymer.

14. The process of claim 3 wherein said glass filaments have a length which is at least as great as the thickness of said article.

References Cited
UNITED STATES PATENTS

| | | | |
|---|---|---|---|
| 3,154,600 | 10/1964 | Munn | 260—884 |
| 3,563,939 | 2/1971 | Stevens et al. | 260—37 B |
| 3,362,942 | 1/1968 | Munn | 260—89.5 |
| 3,234,194 | 2/1966 | Slocum | 260—89.5 |

FOREIGN PATENTS

| | | | |
|---|---|---|---|
| 676,324 | 12/1963 | Canada | 260—41 AG |

OTHER REFERENCES

Modern Plastics Encyclopedia 1966, September 1965, vol. 43, No. 1A, pp. 608 and 611.

Terenzi et al., Engineering Study of Continuous Polymerization of Acrylic Monomers, in I & EC Fundamentals, vol. 18, May 1969, p. 201.

Aluminum Hydrate Filler in Polyester Systems, Connolly et al., Modern Plastics 43, p. 154, October 1965.

The Effects of Fiber Glass Reinforcement on the Flammability Properties of the Thermoplastics, Hattori et al., Plastics Design & Pro., August 1967.

ALLAN LIEBERMAN, Primary Examiner

J. H. DERRINGTON, Assistant Examiner

U.S. Cl. X.R.

161—140, 170, 251, 256, 403; 260—23 R, 41 AG, 41 B; 264—325, 331